Figure 1:
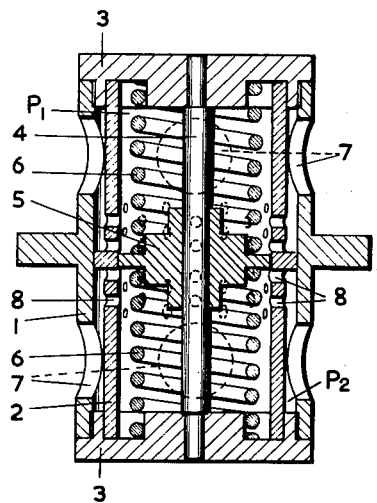

INVENTORS
Herman Carel Anton van Eldik Thieme
Cornelius Pieter Keizer
BY
Mason, Porter, Diller & Stewart
ATTORNEYS

3,092,137
DAMPER USING A GASEOUS FLUID
Herman Carel Anton van Eldik Thieme, Delft, and Cornelis Pieter Keizer, Vlaardingen, Netherlands, assignors to Arie Adrianus de Koning and Kornelis Korstiaan Karel de Koning, both of Oud Beijerland, Netherlands
Filed May 13, 1960, Ser. No. 29,029
1 Claim. (Cl. 137—493)

This invention relates to a damper using a gaseous fluid, which damper is included in an inertia spring system comprising a main reservoir and a resilient or non-resilient additional reservoir, more particularly a shock absorber for vehicles, one or a plurality of passages for the flow of the fluid in two directions being provided between the two reservoirs.

A damper of this type is known. In this known damper a passage having a predetermined constant area is used. As a result the resistance in the said passage has a value which is proportional to the square of the speed of the gaseous fluid flowing through said passage. This phenomenon is highly objectionable when the damper is used as a shock absorber for vehicles, because the damping will then become largely dependent on the amplitude of the vibrations occurring in the inertia spring system.

Now the object of the invention is to so control the passage area for the gaseous fluid that the degree of damping is automatically adapted to the forces and to the movements to which the inertia spring system is subjected.

In order to achieve this object according to the invention the damper is so constructed that the passage area or areas are variable and that for controlling said areas one or more means are provided that are influenced by the relative movements of the inertia spring system or by the pressure differentials in said system caused by said movements.

According to a first embodiment the damper according to the invention may be so constructed that the passage area control means comprises a spring loaded slide valve operating in two directions which in its central position entirely or substantially entirely closes the fluid passage, but which under the influence of a pressure differential between the two reservoirs will leave said central position, the passage area progressively increasing in dependence on the distance of said slide valve from its central position.

A further development of this embodiment may lead to a construction in which the slide valve is cylindrical and in which upon the axial displacement of said valve from its central position, one or a plurality of openings located behind one another in axial direction in the likewise cylindrical wall of the passage are freed. Thus a stepped passage area control is achieved.

A variant of this development may lead to a construction in which the slide valve has a double conical shape and a diameter decreasing from its center, the passage likewise having a double conical shape and a diameter increasing from its center, the arrangement being such that in its central position the slide valve entirely or substantially entirely closes the passage.

Thus a continuous passage area control is obtained.

The invention will now be elucidated with reference to the accompanying drawings, in which:

FIGURES 1 through 4 each show an embodiment of a damper according to the invention.

The damper according to FIG. 1 comprises a housing 1 having a cylindrical lining 2, which housing is closed at either end by a cover 3. The covers 3 support a shaft 4 which guides a cylindrical slide valve 5 which is adapted to freely slide in the lining 2, said slide valve being kept in a central position by two cylindrical helical springs 6 which surround the shaft 4 and which are interposed between the covers 3 and the slide valve 5 in prestressed condition.

The circumference of the housing 1 is provided with apertures 7, while a number of bores 8 are provided in the circumference of the lining 2.

Figure 2:
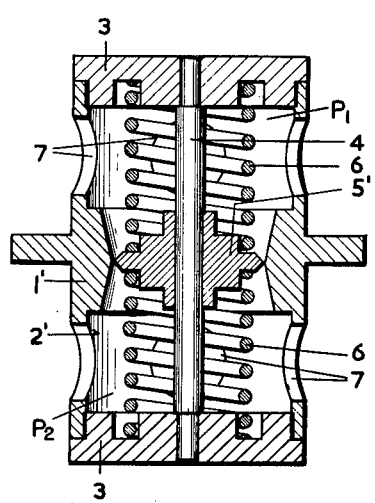

In the embodiment according to FIGURE 2 a housing 1' is provided with a cylindrical passage 2' which has a portion of restricted passage area, which portion is in the shape of a double cone. A slide valve 5' is likewise double conical. For the rest the construction is the same as the one shown in FIGURE 1.

Figure 3:
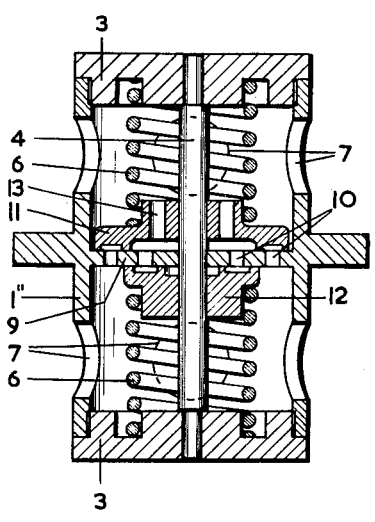

FIG. 3 shows a damper in which the housing 1" is provided with a transverse partition 9 in which a number of bores 10 is provided. On either side of the partition 9 valves 11 and 12, respectively, are mounted for sliding movement on the shaft 4 which passes through the partition 9, said valves being each urged by a spring 6 onto the partition 9 which serves as a seat and thus close the bores 10. The valve 11 is provided with ports 13.

Figure 4:
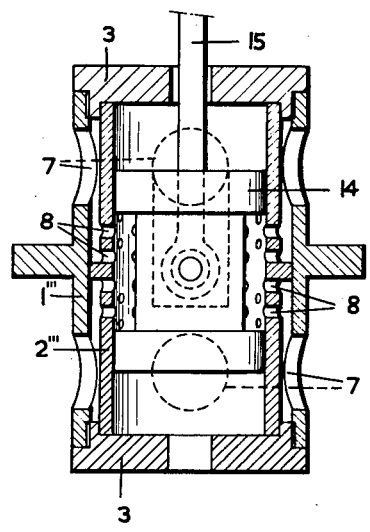

FIG. 4 shows a damper whose housing 1''' is provided with a lining 2''' in which a slide valve 14 is elastically coupled to a connecting member 15 which leads out of the damper.

The operation of a damper constructed in accordance with the foregoing disclosure, for example, the damper of FIGURE 2, is as follows:

The housing 1' of FIGURE 2 is first mounted on an inertia spring system including a first pressure component $P_1$ in communication with an upper portion of the cylindrical passage 2, and a second pressure component $P_2$ in communication with a lower portion of the cylindrical passage 2. A well known inertia spring system is the conventional bellows-type shock absorber employed in vehicles, in which case, the pressure component $P_1$ might constitute the pressure in a main reservoir of the system while the pressure component $P_2$ would constitute the pressure in an additional reservoir. The housing 1 is mounted between the two above-mentioned reservoirs in a manner well known in the prior art whereby a pressure differential between the two reservoirs will cause the spring loaded slide valve 5' to move from the central position shown in FIGURE 2 in a direction dependent upon the pressure differential between the reservoirs.

Thus, when the pressure component $P_1$ increases with respect to the pressure component $P_2$ the pressure differential therebetween causes the slide valve 5' to move downwardly from the position illustrated in FIGURE 2. As the valve 5 moves downwardly, an annular opening is created between the circumference of the valve 5 and the conical-shaped portion of the passage 2', resulting in a balancing of the pressure components $P_1$ and $P_2$ and the spring system.

When the pressure component $P_2$ exceeds the pressure component $P_1$, a like balancing of the pressure components and the spring system occurs, differing only in that the valve 5 moves upwardly from the position shown in FIGURE 2.

With regard to the damper shown in FIGURE 1, as the pressure component $P_1$ becomes greater than the pressure component $P_2$, the pressure differential will cause the valve 5 to move downward from the position illustrated and thereby free more of the openings 8 in the lining 2 and balance the pressure components $P_1$ and $P_2$. The operation of the valve 5 is the same, but in an opposite direction, when the pressure component $P_2$ is greater than the pressure component $P_1$.

The dampers shown in FIGURES 3 and 4 operate in a manner similar to the operation of the damper illustrated in FIGURES 1 and 2, and in a manner obvious to one skilled in the art.

It will be clear that as regards many details a great number of variations and combinations are possible without the scope of the invention being departed from.

We claim:

A damper for use in a shock absorber system for controlling the flow of fluid medium therethrough linearly proportional to the force applied thereto, said damper comprising a cylindrical tubular one-piece housing defining upper and lower peripheral edges, upper and lower covers provided with shoulders in confining internal abutment with the respective upper and lower peripheral housing edges, said upper and lower covers being grooved inwardly of the housing to present oppositely facing bosses adapted for engagement and alignment of upper and lower spring members, said housing having a plurality of equally sized apertures symmetrically formed around the peripheral wall thereof and disposed above and below an internal double conical flow passage within said housing, a shaft secured at opposite ends thereof centrally to the oppositely facing bosses, a valve slidably mounted upon said shaft, said valve being provided with upper and lower shoulders providing second upper and lower bosses in opposed relationship to the first respective oppositely facing bosses, a helical spring surrounding the shaft between each one opposite facing boss and one said second boss, the external diameter of the bosses being substantially equal to the internal diameter of the springs whereby the springs are maintained in accurate longitudinal alignment with the housing and shaft to provide linear flow characteristics of the pressure difference as a function of the volume flow.

References Cited in the file of this patent

UNITED STATES PATENTS

| 1,087,890 | Rogers | Feb. 17, 1914 |
| 1,130,656 | Annable | Mar. 2, 1915 |
| 2,827,283 | Browne et al. | Mar. 18, 1958 |

FOREIGN PATENTS

| 1,060,271 | Germany | June 25, 1959 |
| 819,728 | Great Britain | Sept. 9, 1959 |